June 3, 1969  R. DÖTZER  3,448,127
METHOD OF PRODUCING ONIUM-SALT COMPLEX COMPOUNDS
Filed March 27, 1964
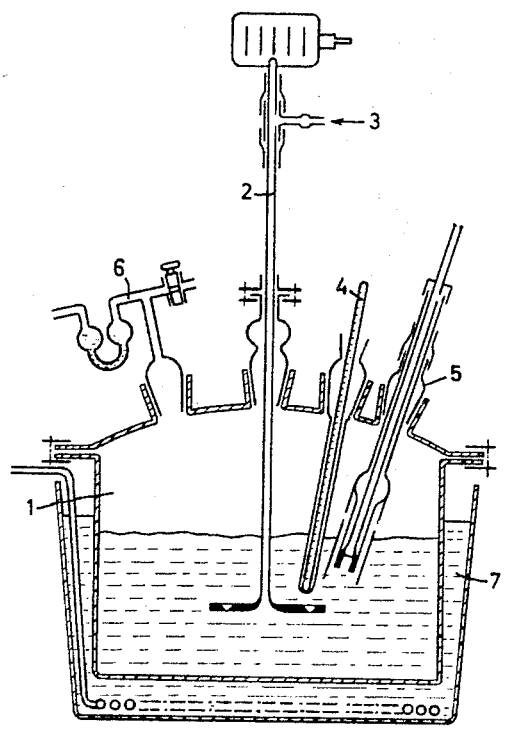

United States Patent Office 3,448,127
Patented June 3, 1969

---

3,448,127
METHOD OF PRODUCING ONIUM-SALT COMPLEX COMPOUNDS
Richard Dötzer, Nuremberg, Germany, assignor to Siemens Aktiengesellschaft, Erlangen, Germany, a corporation of Germany
Filed Mar. 27, 1964, Ser. No. 355,222
Claims priority, application Germany, Mar. 30, 1963, S 84,477
Int. Cl. C07f 9/90
U.S. Cl. 260—429            7 Claims

---

ABSTRACT OF THE DISCLOSURE

Described is a method of producing onium-salt complex compounds, which comprises reacting three components in substantially stoichiometric ratios:

(a) an electron donor compound, $R'_n H_{m-n} Y$;
(b) an electron acceptor compound, $MeR''_n X'_{m-n}$; and
(c) an organyl compound RX.

R, R′, R″ denote radicals chosen from the group consisting of alkyl and aryl radicals which may be the same. H is hydrogen. X is chosen from the group consisting of halogen and pseudo-halogen radicals. X′ is chosen from the group consisting of halogen and hydrogen. Y is chosen from the group consisting of elements from N, P, As, Sb, Se and Te. Me is chosen from the group consisting of elements from Be, Zn, Al, Ga, In, B and Sn; $m$ denotes the valence of the respective elements Y and Me, the index $n$ assuming the values above zero to $m$.

Some specific onium salt complexes are:

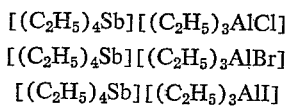

$$[(C_2H_5)_4Sb][(C_2H_5)_3AlCl]$$
$$[(C_2H_5)_4Sb][(C_2H_5)_3AlBr]$$
$$[(C_2H_5)_4Sb][(C_2H_5)_3AlI]$$

The onium-salt complex compounds of the invention are useful as electrolytes for producing highly pure metals.

---

As evidenced by publications, there has been a notable recent interest in organo-aluminums and particularly alkyl aluminums. The complexing ability of the alkyl aluminums has been utilized in such fields as olefin polymerization as a catalyst and as auto-oxidation promoters in the synthesis of straight-chain alcohols by hydrolysis of the alkyl aluminums.

The alkyl aluminums combine with a number of substances to form complex compounds which are of technological interest and are being utilized in practice. This applies particularly to the complexes of triethyl aluminum with alkali halides, alkali hydrides and alkali alkyls, which by virtue of their conductivity have found considerable technological interest, inter alia, as molten electrolytes for electro-refining of aluminum, for the electrolytic production of sodium, as well as in the production of metal alkyls of elements in the second to sixth groups of the periodic systems.

Heretofore, the compounds of alkyl aluminums with ethers, thioethers or tertiary amines have been without practical significance. The electrolyte complex salts of the alkyl aluminums with quaternary ammonium salts have been of little use compared to the alkali salts because of difficulties in preparing them in quantity in pure form, free from solvents. Made by the prior art methods these compounds are costly and, being very hygroscopic, are inconvenient to handle, particularly as complexing agents for uniting with the extremely hydrolysis-sensitive alkyl aluminums.

My invention is predicated upon the preparation of the metalorganic electrolyte complex salts with quaternary ammonium cations and their use in the electrochemical production of pure metals for use with semiconductor techniques.

The electrolyte complexes of this invention are particularly useful because higher degrees of purity of the metal to be refined or precipitates in the form of thin films or layers are attainable via these complexes inasmuch as no other metals are contained in the electrolyte complex molecule. Furthermore, various metals significant to semiconductor techniques and requiring an extreme degree of purity can be produced more economically by the use of these electrolyte complexes. For example, the production of gallium-, indium-, or zinc-organic electrolyte complex salts without these complexes would require the use of the alkali halides of rubidium and cesium because only such halide electrolytes exhibit sufficient conductivity; however, because they are too expensive, these compounds are not suitable for practical purposes.

For the production of metalorganic electrolyte complex salts with quaternary ammonium cations, the trialkyl metals, being sensitive to air and humidity, must be supplied with finely divided and absolutely dry reaction components under exclusion of air. "Absolutely dry" is here understood to be not only free of water but also free of acidic hydrogen-containing solvents, such as alcohols, primary and secondary amines, acids or the like. However, it is the incomplete removal of water of crystallization, solvent alcohol, halogen hydride and the like which, relative to the quaternary ammonium chlorides and ammonium fluorides particularly advantageous for electrolytic purposes, that causes considerable difficulties and, on account of dissociation and dissociation reactions, leads to impure products and appreciable losses in yield. Even more disturbing with respect to purity of the products are side reactions in the synthesis of quaternary ammonium salts under pressure and at elevated temperatures. Appreciable proportions of non-quaternary salts (for example $R_3HN-X$) and acidic salts ($R_4N-X \cdot HX$) can be found in products made in this manner and make it infeasible to employ them for the complex formation with proton-sensitive alkyl metals. In many cases an onium halogenide formation cannot take place even with the application of pressure and a higher temperature.

It is an object of my invention to provide a process that is free of the above-mentioned deficiences or disadvantages and that is suitable for the production of onium salt complex compounds.

According to the invention, three components in purest feasible form, particularly liquid or gaseous components, are reacted with each other in stoichiometric quantitative ratios, namely a donor compound $R'_n H_{m-n} Y$, an acceptor compound $MeR''_n X'_{m-n}$ and an organyl compound RX, wherein R, R′ and R″ are the same or different alkyl or aryl radicals, H denotes a hydrogen atom, X a halogen, pseudohalogen or another equivalent radical of an acid, and X' a halogen or a hydrogen atom, Y is an element from the fifth or sixth main group of the periodic system of the elements, and Me an element from the second third or fourth main group of the periodic system of elements. The bonding ability or valence of the particular elements Y and Me is denoted by $m$, and the index $n$ represents the values zero to $m$. The term onium-salt complex compounds is herein understood to refer to compounds that can be looked upon as being built up of an onium salt and an acceptor molecule, with the acid radical of the onium salt being in a complex bond with the acceptor molecule. The method of the invention for producing onium salt complexes avoids the need for the separate preparation of the hygroscopic quaternary onium salts. Furthermore, the invention is particularly suitable for producing onium salts that previously were of difficult accessibility and whose preparation required excessive and uneconomic pressures. According to the novel process, the onium-salt complex compound is obtained first, and the compound can then be modified in the manner described to obtain the onium salt. The invention will be more explicity set forth and explained below.

For producing the complexes of this invention I utilize the thermodynamically favored heterolytical dissociation reaction of organyl compounds according to an acceptor-donor-reaction system. This reaction, which leads to the desired compounds within a short reaction time can be represented, in general formulation, by the following equation:

$$D(onor) + A(cceptor) + RX \rightarrow [DR]^+ [AX]^-$$

In contrast with the previous methods of producing such compounds, the novel method of this invention operates with liquid and gaseous starting materials that are readily accessible in pure form, and provides the onium-salt complex compounds in extremely pure form. The synthesis can be expressed by two component equations $a$ and $b$ which shall be discussed with reference to the trialkyl compounds of the elements from the third and fifth main group of the periodic system, but are analogously applicable also to the formation of the other onium-salt complex compounds.

The processing mode I involves an acceptor-donor coordination compound $(R'_3N:AlR''_3)$:

I (a) $R'_3N: + AlR''_3 \rightarrow R'_3N:AlR''_3$ (b) $R'_3N:AlR''_3 + RX \rightarrow [R'_3NR][R''_3AlX]$ In most cases, the coordination compounds which are formed when these trialkyl compounds are brought together, are colorless liquids which melt at relatively low temperatures and are by far less sensitive to air and humidity than their components. Consequently, these preparatory products for the electrolyte complex production can be stored in a simple and advantageous manner. When RX is added, the reaction leading to onium-salt complex compounds commences, and the electrolytic conductance increases. As a result, the formation of onium salt complex compounds can be followed and controlled conductometrically. This is of advantage particularly in the reaction of gaseous complex agents because it permits eliminating the necessity of weighing these gaseous substances.

The processing mode II takes place through an RX-acceptor adduct or RX-acceptor mixture $R(R''_3AlX)$:

II (a) $RX + AlR''_3 \rightarrow AlR''_3/RX$ or $R[R''_3AlX]$ (b) $R[R''_3AlX] + R'_3N: \rightarrow [R'_3NR][R''_3AlX]$ This processing mode is preferable particularly for the reaction of liquid RX-components with thermally sensitive acceptor or donor molecules, for example triethyl indium, triisobutyl antimony and similar compounds. The excess of RX employed, aside from serving also as a solvent, effectively dilutes and dispenses the heat of the reaction. This processing mode lends itself preferably to the production of pure onium-salt complex compounds, in cases where the resulting onium-salt complex compounds are insoluble in surplus RX and will precipitate at lower temperatures in crystalline constitution. Then, the separation of the RX excess is thus particularly simple.

Processing mode III involves an RX-donor mixture $R'_3N/RX$:

III (a) $RX + R'_3N: \rightarrow R'_3N/RX$ (b) $R'_3N/RX + R''_3Al \rightarrow [R'_3NR][R''_3AlX]$ This mode of processing is particularly of interest from the viewpoint of the reaction mechanism because it is not only more closely related to the known method of producing onium-salt complex compounds (from onium salt and acceptor compounds) but in distinguishing thereover permits very clearly the recognition of advantages and the effectiveness of the novel method. The addition of alkyl halogens to trialkylamine, -phosphine, -arsine and -stibine is used for the formation of quaternary onium salts, but proceeds under normal conditions at a sufficient speed only with the alkyl iodines:

$$R'_3N: + RI \rightarrow [R'_3N:R]I$$

With alkyl bromides and even more so with alkyl chlorides it is necessary to apply higher temperatures and often also apply pressure in order to achieve the combination of the reaction partners during reasonable or acceptable reaction periods. However, these stringent conditions promote side reactions with resulting contaminated products. Further, in many cases it is impossible, even when applying pressure and high temperature, to arrive at onium halides, as will be shown with the example of the stibonium halide, which is derived from trialkyl antimony as the weakest trialkyl of the elements from the fifth main group that is still capable of forming quaternary onium salts.

Starting from triethyl antimony, tetraethylstibonium iodide can still be obtained as a colorless, crystalline substance by operating with ethyl iodide at normal pressure. However, with ethyl bromide, the reaction is no longer obtainable even by boiling for several days and recycling. With ethyl chloride, the attempt is completely futile. Now, while the mixture triethyl antimony/ethyl iodide hardly possesses a still discernible reaction rate at room temperature, the mixtures triethyl antimony/ethyl bromide and triethyl antimonyl/ethyl chlorides are completely stable at normal pressure and exhibit no increase in electrical conductivity. However, should triethyl aluminum (or triethyl gallium and so forth) be dripped into these mixtures, then the conductance of the reaction mixtures rises instantaneously due to the formation of the corresponding onium salt complex compounds:

$$Sb(C_2H_5)_3/C_2H_5Br + Al(C_2H_5)_3 \rightarrow [(C_2H_5)_4Sb][(C_2H_5)_3AlBr]$$

Chloro-derivative as well as bromo-derivative at room temperature are colorless liquids having electric conductance values of approximately $10^{-2}$ ohm$^{-1}$ cm.$^{-1}$.

The third reaction mode, definitely resulting in the pure quaternary ammonium salt, also affords essential advantages with those mixtures which will react at elevated temperatures and/or pressures, but with the formation of side products. This is the case, for example, with the mixtures of triethyl amine/ethyl chloride, and triethyl antimony/ethyl iodide.

From preparatory viewpoints, the third processing variant is preferable particularly with those liquid complex partners that do not react with each other at room temperature and therefore can be stored as $R'_3Y/RX$ mixtures and then can be brought to reaction, as may be required, with one or the other MeR″₃. Due to the presence of the normally incombustible RX in the mixture, the tendency to spontaneous ignition of the MeR″₃ component is greatly reduced.

The onium-salt complex compounds can also be produced in accordance with the above component Equations a and b in a single reaction stage. Such production methods can properly be called "single pot" processes.

The so-called 1:2 complex compounds which result from addition of the further acceptor molecule to the 1:1 complex:

[R₄N] [R₃MeX] +MeR₃→ [R₄N] [R₃MeXMeR₃]

are often employed as electrolytes in metal electrorefining.

The above-described possibilities, however, do not exhaust the field of application for the novel method of this invention. In lieu of the R′₃N stated in the reaction equations, the donor molecules R′₃P, R′₃As, R′₃Sb can be employed and are equivalent. Similarly, GaR″₃, InR″₃, BR″₃ and TlR″₃ can be used in lieu of AlR″₃, and are fully equivalent thereto. Furthermore, the acceptor properties of the MeR″₂- and MeR″ₙX₄₋ₙ molecules of the elements from the second or fourth group of the periodic system permit extending the novel process also to these compounds. This also applies, analogously, to the molecules R′₂Y of elements from the sixth main group of the periodic system, and to the R′₃Y molecules of the elements from the fifth main group which exhibit donor properties and are likewise capable of forming onium salts.

The invention will be further described with reference to examples and in conjunction with the accompanying drawing.

The drawing shows schematically an apparatus favorable for performing the reaction examples. The apparatus comprises a reaction vessel 1, a vibro-mixer 2 of glass having a hollow nipple 3 for the introduction of gas, a thermometer 4, and a conductance measuring cell 5 for checking and supervising the progress of the reaction. The inert-gas seal 6 may also be placed upon an interposed reflux condenser. The reaction vessel 1 is immersed in a heatable oil bath 7.

EXAMPLE 1

Tetramethylammonium-triethyl aluminum chloride [(CH₃)₄N]⁺[(C₂H₅)₃AlCl]

For preparing the coordination compound

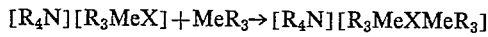

114 g. (=1 mol) triethyl aluminum is introduced into the one-liter reaction vessel filled with nitrogen. Thereafter at least 1 mol dry trimethylamine gas is introduced at room temperature into the gas phase above the triethyl aluminum while stirring. The reaction is exothermic. Trimethylamine-triethyl aluminum of 100% yield is obtained. The substance is also designatable as triethyl-aluminum-trimethylamine. Distillation furnishes at 116 to 118° C. and 13 torr a colorless water-clear liquid which freezes only below −45° C. and possesses a specific conductance of <1·10⁻⁶ ohm⁻¹ cm.⁻¹ at 25° C.

When processing larger quantities, the use of solvents for the dissipation of heat is advisable. Aliphatic and hydroaromatic hydrocarbons are applicable for this purpose.

The coordination compound is heated to 100 to 120° C. and admixed with dry methyl chloride by vigorous stirring. From the reaction initiated by this addition, a virtually 100% yield of tetramethylammonium-triethylaluminum chloride is obtained. This is a clear colorless complex salt melt which solidifies in crystalline form at about 40° C. and possesses at 100° C. a specific conductance of 2.1·10⁻² cm.⁻¹. The introduction of 1 mol methyl chloride (=50.5 g.) at a flow rate of about 250 m-liter/min. is terminated in approximately ten hours.

It can be accelerated by supplying the methyl chloride under superatmospheric pressure.

Admixing a second mol of triethyl aluminum and heating to 100 to 120° C. results in the 1:2 complex

[(CH₃)₄N]⁺[(C₂H₅)₃AlClAl(C₂H₅)₃]⁻

This colorless electrolyte complex solidifies in crystalline form at 70° C. and has at 80° C. a specific conductance of 1.6·10⁻² ohm⁻¹ cm.⁻¹. An excess of 5 mol percent of triethyl aluminum reduces the melting range to 35 to 40° C. With an excess of 10 mol percent of triethyl aluminum a liquid melt at room temperature is obtained.

EXAMPLE 2

Trimethylbenzylammonium-triethyl aluminum fluoride [(CH₃)₃N(C₆H₅)]⁺[(C₂H₅)₃AlF]⁻

The coordination compound (CH₃)₃N:Al(C₂H₅)₃ is prepared as in Example 1:

An amount of 173.3 g. trimethylamine-triethyl aluminum (1.0 mol) is heated to 50° C. in the reaction vessel according to the drawing. Admixed thereto with the aid of the vibro-mixer are 110.1 g. benzylfluoride (1.0 mol) by slowly dripping the quantity into the vessel within a period of about 50 minutes. The electrolytic conductance of the system immediately increases appreciably. After completion of the addition, the contents are heated to 100° C. and the stirring is continued for another half-hour.

At 100° C. the specific electrolytic conductance is 1.7·10⁻² ohm⁻¹ cm.⁻¹. The colorless, completely clear and slightly oily liquid solidifies at temperatures as low as −55 to −60° C. and is thermally stable at temperatures as high as 160° C.

Surprisingly, the complex salt liquid is no longer inflammable in air and can safely and easily be handled. It likewise reacts with water much less vigorously than the known aluminum-organic complex compounds of triethyl aluminum.

When an equimolar quantity of triethyl aluminum is added to the 1:1 complex and the mixture is heated to 100 to 110° C. under vibro-mixing, the colorless 1:2 complex is obtained which solidifies at −95 to −98° C. and possesses at 100° C. a specific conductance of 1.74·10⁻² ohm⁻¹ cm.⁻¹.

EXAMPLE 3

Methyltriethylammonium-triethyl aluminum chloride

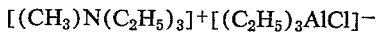

For preparing the onium-salt complex compound, the three reaction components are introduced into a pot, namely into a reaction vessel as shown on the drawing, and they are caused to react simultaneously. Instead of the simple inert-gas seal, a fluid-injection accessory, containing a dripping funnel with a pressure equalizing tube and a reflux condenser with inert-gas seal, is placed on top of the vessel. The triethyl aluminum is introduced first into the reaction vessel under an atmosphere of inert gas, and dry methyl chloride is bubbled through while the contents are heated to 80–100° C. Thereafter, the vibro-mixer is placed in operation and, while a medium-strong current of methyl chloride (about 150–250 m-liter/min.) is continuously introduced, the calculated quantity of freshly distilled triethylamine is slowly dripped into the liquid. The progress of the complex salt formation is observed by measuring the conductivity of the system. This increases with the degree of triethylamine addition. After adding the equimolar quantity, conductivity attains a maximum value of about 2.9·10⁻² ohm⁻¹ cm.⁻¹ at 100° C. The colorless onium-salt complex compound is liquid at room temperature.

A medium-strong current of methyl chloride was bubbled through 100 ml. triethyl aluminum (83.7 g.) corresponding to a 0.8 molar quantity. In about 40 minutes the substance was converted with 110 ml. triethylamine (=81.0 g.) to the onium-salt complex compound.

For preparing the corresponding 1:2 complex, a second mol triethyl aluminum can be added to the 1:1 complex. Another way of proceeding is to commence the process with twice the molar quantity of triethyl aluminum and, while introducing chloromethyl, supplying only a single molar quantity of triethylamine by dripping.

EXAMPLE 4

Tetramethylammonium-triethylgallium chloride
$[(CH_3)_4N]^+[(C_2H_5)_3GaCl]^-$

The coordination compound trimethylamine-triethylgallium is prepared in accordance with the trimethylamine-triethylaluminum of Example 1. In lieu of the triethylgallium, triethylgallium monoetherate $Ga(C_2H_5)_3 \cdot O(C_2H_5)_2$ can also be used.

The colorless coordination compound contained in the reaction vessel, having a boiling point of 92° C. at 13 torr and a specific conductant of $<1 \cdot 10^{-6}$ ohm$^{-1}$ cm.$^{-1}$ at 25° C., is heated to 100–120° C. and reacted with dry methyl chloride, which is supplied through the hollow shaft of the vibro-mixer. To prevent losses of substance through the moderately fast methyl chloride current (200–300 ml./min.), an oil-cooled condenser having an inert-gas closure is employed. In comparison with the corresponding triethyl aluminum compound, a weaker coordinative bonding is exhibited by the trimethylamine relative to the triethylgallium

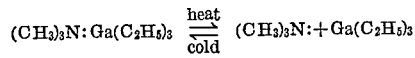

As a consequence, the methyl chloride is more rapidly and more readily accepted, as may be ascertained conductometrically. Toward the end of the reaction, the product has a specific conductivity of about $2.3 \cdot 10^{-2}$ ohm$^{-1}$ cm.$^{-1}$ at 100° C.

The 1:1 complex is colorless-crystalline at room temperature and melts between 80 and 85° C., and the yield is virtually 100% based on the organogallium starting material.

As with the corresponding triethyl aluminum complex salts, the 1:1 complex in the present example can also be converted to the 1:2 complex by adding an equimolar quantity of triethylgallium. After adding the triethylgallium and heating to 100° C., some waiting period elapses until a constant conductance value of about $1.9 \cdot 10^{-2}$ ohm$^{-1}$ cm.$^{-1}$ results and then the liquid is permitted to cool. The 1:2 complex solidifies about 15–20° C. lower than the 1:1 complex.

EXAMPLE 5

Tetraethylammonium-triethylaluminum chloride
$[(C_2H_5)_4N]^+[(C_2H_5)AlCl]^-$

Under conditions as more fully described in Example 1, triethylaluminum is converted to coordination compound triethylamine-triethylaluminum by dripping triethylamine in pure form or diluted with solvent into the starting material triethyl aluminum. The resulting liquid boils at 99–102° C. at 0.6 torr and has a specific conductance of $<1 \cdot 10^{-6}$ ohm$^{-1}$ cm.$^{-1}$ at 25 C.

The colorless coordination compound $(C_2H_5)_3N:Al(C_2H_5)_3$ is heated to 120° C. and converted with dry ethyl chloride gas under vibro-mixing to the onium salt. By measuring the increase in conductivity, the progress of complex-salt formation is observed. In about six hours at 120° C. a conductivity value of about $2.4 \cdot 10^{-2}$ ohm$^{-1}$ cm.$^{-1}$ is attained. The resulting product is a colorless, homogeneous complex-salt melt which when being cooled will solidify below −50° C.

By admixing the equimolar quantity of triethylaluminum to the 1:1 complex, the 1:2 complex is obtained to secure a rapid and homogeneous introduction of the triethylaluminum, the liquid while being stirred is heated to 100° C. and the occurrence of a constant conductance value of about $1.6 \cdot 10^{-2}$ ohm$^{-1}$ cm.$^{-1}$ is an indication of completion of the reaction. The colorless electrolyte liquid thus obtained solidifies at about 15° C.

EXAMPLE 6

Tetraethylstibonium-triethylaluminum chloride
$[(C_2H_5)_4Sb]^+[(C_2H_5)_3AlCl]^-$ A reaction vessel according to the drawing is supplied with 50 ml. triethylaluminum (=41.1 g.) and 57.2 ml. triethylantimony (=75.3 g.) under inert gas at room temperature. With appreciable development of heat, a colorless, homogeneous liquid is formed. The specific conductance of this liquid at 50° C. is measured as $2.4 \cdot 10^{-5}$ ohm$^{-1}$ cm.$^{-1}$. A stream of dry ethyl chloride of about 150–200 ml./min. is introduced during vibro-mixing and is received into the liquid by an exothermic reaction. Simultaneously the conductance of the system increases rapidly. For example, after 15 minutes the conductance is $1.6 \cdot 10^{-3}$ ohm$^{-1}$ cm.$^{-1}$ at 50° C., and after 150 minutes attains a value of $1.4 \cdot 10^{-2}$ ohm$^{-1}$ cm.$^{-1}$. The bath temperature is increased to 100° C. and the ethyl chloride introduction is continued for another 30 minutes until a constant conductance value of $2.45 \cdot 10^{-2}$ ohm$^{-1}$ cm.$^{-1}$ is observed.

The colorless, thermally stable electrolyte is liquid at −70° C. At 150° C. the specific conductance is $3.9 \cdot 10^{-2}$ ohm$^{-1}$ cm.$^{-1}$.

EXAMPLE 7

Tetraethylstibonium-triethylaluminum bromide
$[(C_2H_5)_4Sb]^+[(C_2H_5)_3AlBr]^-$ Into a reaction vessel according to the drawing, equipped with a dripping funnel and return-flow cooler, 82.2 g. triethylaluminum (0.720 mol) and 150.2 g. triethylantimony (0.720 mol) under inert gas at room temperature are introduced. Thereafter, 82.0 g. dry ethylbromide (0.750 mol) is dripped into the vessel under vibro-mixing. The ethyl bromide addition initiates a strong exothermic reaction. The result is the onium-salt complex compound $[(C_2H_5)_4Sb][(C_2H_5)_3AlBr]$ which is colorless and liquid at room temperature. The addition of the ethylbromide can be followed conductometrically.

When employing larger quantities, it is preferable to operate in the presence of solvents for more efficient removal of the reaction heat. All liquids that are inert relative to the reaction system are suitable, particularly aliphatic and hydroaromatic hydrocarbons such as n-hexane, cyclohexane and Decalin. It is advisable to dilute the coordination compound as well as the halogen alkyl being dripped into the compound. Because of the triethylaluminum component, the reflux condenser and the heating bath must be provided with non-viscid liquid silicone-oils or other inert liquid.

The onium-salt complex compound, solidifying at −18 to 20° C., is only slightly sensitive to air and humidity in comparison with triethylaluminum and triethylantimony and therefore can conveniently be handled and stored. At 100° C., the onium-salt complex compound has a specific conductivity of $2.4 \cdot 10^{-2}$ ohm$^{-1}$ cm.$^{-1}$. A virtually quantitative yield is obtained.

EXAMPLE 8

Tetraethylstibonium-triethylaluminium iodide
$[(C_2H_5)_4Sb]^+[(C_2H_5)_3AlI]^-$ Under inert gas (N$_2$ or Ar), 52.2 g. triethylantimony and 28.6 g. triethylaluminum (i.e. ¼ mol each) are placed together in the reaction vessel. Thereafter, 39.0 g. ethyl iodide are added. By heating to 100° C. under stirring, a complete conversion is secured and a colorless, pure liquid is obtained which gradually solidifies at 0° C. and has a specific conductance of about $2.0 \cdot 10^{-2}$ ohm$^{-1}$ cm.$^{-1}$ at 100° C. This iodine complex is thermally quite stable: at 150° C. the conductance of $3.16 \cdot 10^{-2}$ ohm$^{-1}$ cm.$^{-1}$ was measured. It is insoluble in n-hexane and other aliphatic hydrocarbons.

EXAMPLE 9

Triethylbenzylammonium-triethylaluminum chloride
$[(C_2H_5)_3N(C_6H_5)]^+[(C_2H_5)_3AlCl]^-$ The coordination compound is prepared as described in Example 5.

The reaction vessel according to the drawing and provided with a reflux condenser is filled with 56.0 g. (0.265 mol) of the coordination compound and heated to 100° C. with the aid of an oil bath. Under stirring and continuous observation of the conductance, 33.54 g. (0.265 mol) of freshly distilled benzyl chloride is added in milliliter portions. The ensuing reaction is exothermic and results in the formation of onium-salt complex compound. After about 8 hours a constant value of the specific conductance of $0.81 \cdot 10^{-2}$ ohm$^{-1}$ cm.$^{-1}$ at 100° C. is obtained. The colorless complex-salt liquid is of oily consistency at room temperature, and is a clear mobile liquid above 180° C. Commencing at 130° C., a slight gas evolution is observed.

For forming the 1:2 complex, somewhat more than the equimolar quantity of triethylaluminum is added to the 1:1 complex. After heating to 100° C. for one hour under stirring, the reaction liquid is cooled to room temperature and 120 ml. n-hexane is added and vigorously stirred for 2-3 hours in order to remove the excess of triethylaluminum. The surplus of $Al(C_2H_5)_3$-containing n-hexane is pippetted off, and residual n-hexane is distilled at normal pressure. A colorless electrolyte is obtained which is clear at room temperature and evolves gas above 155° C. At 100° C. a specific conductance of $1.16 \cdot 10^{-2}$ ohm $^{-1}$ cm.$^{-1}$ is measured.

EXAMPLE 10

Triethylbenzylammonium-triethylfluorgallanate
$[(C_2H_5)_3N(C_6H_5)]^+[(C_2H_5)_3GaF]^-$ At room temperature in an inert gas atmosphere, 30.4 g. (=0.300 mol) freshly distilled triethylamine are dripped into 47.1 g. (=0.300 mol) triethylgallium. The resulting colorless coordination compound is rectified by distillation under reduced pressure. Its boiling point is 48–49° C. at 0.1 torr, the melting point about −25° C.

In the reaction vessel according to the drawing, 71.1 g. (0.275 mol) of the resulting coordination compound at 100° C. is mixed with 30.3 g. (0.275 mol) of benzylfluoride which is supplied in milliliter amount from a burette. From the first milliliter addition of benzylfluoride, the specific conductance of the reaction system increases from the $10^{-6}$ range. After adding the first 12 milliliters from the total of 29.4, the specific conductance reaches the range of $10^{-2}$ ohm$^{-1}$ cm.$^{-1}$. After the addition is completed and a total of about 9 hours reaction time is permitted, a conductance value of $1.65 \cdot 10^{-2}$ ohm$^{-1}$ cm.$^{-1}$ at 100° C. is achieved, and the formation of the 1:1 complex, liquid at room temperature is finished. The electrolyte complex solidifies below −70° C. and is no longer self-ignitable in air. Its reaction with water is relatively mild.

EXAMPLE 11

Triethylbenzylphosphonium-triethylaluminum fluoride
$[(C_2H_5)_3P(C_6H_5)]^+[(C_2H_5)_3AlF]^-$ In a three-neck flask with stirrer, dripping funnel and reflux condenser, 20.4 g. (0.172 mol) pure triethylphosphine is diluted with 75 ml. n-hexane in inert gas and reacted under stirring within 15 minutes with 19.7 g. (0.172 mol) freshly distilled triethylaluminum dissolved in 50 ml. n-hexane. After 20 minutes of refluxing, the solvent is distilled off at normal pressure, and the remaining coordination compound is subjected to vacuum distillation.

The yield is 36.0 g., corresponding to 90% of the theoretical yield. A colorless liquid is obtained whose boiling range is 80–87° C. at 0.06–0.08 torr and which solidifies at −43 to −45° C.

28.8 g. (0.124 mol) of the freshly distilled coordination compound is supplied to the reaction vessel equipped with a conductance measuring cell and a reflux condenser with inert-gas seal. Into the vessel are dripped 13.7 g. (0.124 mol) benzylfluoride at 50° C. The fluoride is rapidly absorbed in a strongly exothermic reaction, and the specific conductance of the mixture increases immediately. After one-half of the benzylfluoride quantity is added, the rate of increase in conductance becomes considerably shallower and as stoichiometric proportions are completed reaches a final value of $0.82 \cdot 10^{-2}$ ohm$^{-1}$ cm.$^{-1}$ at 50° C. The electrolyte complex melts at −66 to −69° C. Its specific conductance at 100° C. is $1.64 \cdot 10^{-2}$ ohm$^{-1}$ cm.$^{-1}$. The somewhat yellowish liquid is no longer self-igniting in air.

37.7 g. (0.110 mol) of the 1:1 complex is mixed at room temperature with an equimolar quantity of 12.6 g. triethylaluminum. The heat of reaction heats the contents of the reaction vessel to 55° C. Thereafter the vessel is further heated for about 10 minutes in an oil bath of 100° C. The resulting 1:2 complex has a specific conductance of $1.20 \cdot 10^{-2}$ ohm$^{-1}$ cm.$^{-1}$.

The thermal stability of the compound was tested by maintaining it for 5 hours at 120° C. The specific conductance was found to have changed only from 1.54 to $1.52 \cdot 10^{-2}$ ohm$^{-1}$ cm.$^{-1}$, and the yellow coloring became more intense.

EXAMPLE 12

Trimethylbenzylammonium-triethylfluorogallanate
$[(CH_3)_3N(C_6H_5)]^+[(C_2H_5)_3GaF]^-$ The coordination compound $(CH_3)_3N:Ga(C_2H_5)_3$ was prepared in the manner described in Example 1. The colorless liquid obtained by fractional distillation at 41–43° C./<0.01 torr solidifies at −35 to −37° C. and possesses an analyzed gallium content of 32.4% (theoretical 32.24% Ga) and a specific conductance of $0.73 \cdot 10^{-6}$ ohm$^{-1}$ cm.$^{-1}$ at 100° C.

A one-liter reaction vessel according to the drawing is supplied with 216 g. (=1.0 mol) trimethylamine-triethylgallium under inert gas and heated to 120° C. Under vibro-mixing, 107 ml. benzylfluoride (=101.1 g.=1.0 mol) is run into the vessel in portions. The progress of the exothermic reaction is followed by measuring the conductivity of the reaction liquid. The addition of benzylfluoride is completed in about 15 hours, and a constant conductivity of about $2 \cdot 10^{-2}$ ohm$^{-1}$ cm.$^{-1}$ is attained. The clear complex-salt melt has a slightly yellowish-green coloration, is no longer self-igniting and no longer fumes in air. It is dissociated slowly and without vigor by water. In comparison with triethylgallium and the other gallium-organo complex salts it is more conveniently handled. The liquid solidifies below −62° C. and is thermally stable up to 150° C.

For preparing the 1:2 complex, an equimolar quantity of freshly distilled triethylgallium (148.59 gm.) is added to the 1:1 complex, and the liquid is heated for about one hour to 100° C. The triethylgallium (boiling point 38–42° C./13 torr), when added, results in an exothermic reaction that causes the reaction liquid temperature to increase to about 45° C. The clear 1:2 complex is liquid at room temperature and retains an only very feeble yellowish-green color. It exhibits only feeble auto-oxidation and hydrolysis rates, thus having substantially the same advantageous properties with respect to handling as the 1:1 complex. The 1:2 complex melts above −95° C. and is thermally very stable.

EXAMPLE 13

Triethylpropylstibonium-triethylindium bromide $$[(CH_2H_5)_3Sb(C_3H_7)]^+[(C_2H_5)_3InBr]$$

In a 500-ml. reaction vessel according to the drawing, 41.8 g. (0.2 mol) triethylantimony and 40.4 g. (0.2 mol) triethylindium in freshly distilled condition are brought together under an inert gas blanket. A temperature increase from 24 to 35° C. is observed. The clear compound, melting at about −75° C., exhibits at 50° C. a specific conductivity of $4.0 \cdot 10^{-6}$ ohm$^{-1}$ cm.$^{-1}$.

The liquid is heated to 90–110° C. and reacted with stirring with the calculated quantity of n-propyl bromide. When this quantity is added dropwise, the specific conductivity of the reaction liquid increases rapidly and attains, after addition of 2 ml. n-$C_3H_7Br$, a conductivity in the range of $10^{-3}$ ohm$^{-1}$ cm.$^{-1}$.

After complete addition of the n-propyl bromide, which also may be added all at once, a specific conductivity of about $1.85 \cdot 10^{-2}$ ohm$^{-1}$ cm.$^{-1}$ at 100° C. is measured. The virtually colorless complex-salt liquid is thermally stable to about 125° C., slightly oily at room temperature, and solidifies only below −67° C. While triethylindium is sensitive to light and precipitates finely divided metallic indium, the complex compound does not exhibit any change in light. The coordination compound also shows greater stability to light.

When an equimolar quantity of triethylindium is added to the 1:1 complex at room temperature, the corresponding 1:2 complex is formed by exothermic reaction. With the liquid quantities given in the example, the temperature of the system increases to about 40° C. Thereafter the reaction liquid is heated for about 1 hour to 80° C. Ultimately, a constant specific conductance of about $0.96 \cdot 10^{-2}$ ohm$^{-1}$ cm.$^{-1}$ is attained. The completely clear, almost colorless complex-salt melt solidifies below −90° C. Above 135° C. it liberates gas and shows a reduction in conductance. A change of the electrolyte complex when exposed to light was not observed.

Further tests have shown that by analogous modes of operation, onium-salt complex compounds of diethylzinc can also be obtained, these being of interest as electrolytes for the refining of zinc or for the zinc-plating of metals and semiconductors in oxygen-free and humidity-free media. By introducing methyl chloride and trimethylamine into a quantity of diethylzinc in the molar ratio 1:1:2 an almost colorless complex-salt liquid was obtained.

Among the elements of the second group in the periodic system, beryllium and cadmium are closest to zinc from the viewpoint of electronegativity. Complex organometal compounds of these elements have already been described, and it is also within the scope of the invention to form onium-salt complex compounds. In accordance with the fact that the properties of the compounds $KF \cdot Be(C_2H_5)_2$ and $KF \cdot 2Be(C_2H_5)_2$ are largely similar to those of the corresponding aluminum compound, a similarly good electrolyte character is apparent. This applies also to the quaternary onium-salt complex compounds of beryllium, which according to the method of the invention, can be produced as 1:1, as well as 1:2 ammonium-salt complexes, and which then correspond to the following formulas:

$$[R'_3NR][R''_2BeX], \quad [R'_3NR][R''_2BeXBeR''_2]$$

Relative to the elements from the fourth group of the periodic system, tests with tin-organic compounds (for example $R_2SnX_2$) have had the result that relative to this element there also exist complex compounds according to this invention, for example $[R_4N]_2[R_2SnF_4]$. The same applies to complex compounds of the general formulas $[R_4N]_2[RSnX_5]$ and $[R_4N]_2[R_3SnX]_3$ which derive from $RSnX_3$ or $R_3SnX$.

A large number of coordination compounds of the type $R'_2Me:MeR''_3$ with elements from the sixth main group of the periodic system are known. According to their bonding character, these are less stable than the onium-salt complex compounds. Based on this fact, as well as because of the great similarity between onium ions of elements from the fifth main group and the selenonium- and telluronium-derivatives, onium-salt complex compounds are also readily obtainable with the elements from the sixth main group, such as selenium and tellurium. In lieu of the organo-halides, the dialkyl sulfates can also be converted to onium-salt complex compounds. Also accessible by the method of this invention are halogen-free onium-salt complex compounds, by addition of pseudohalogenorganyls, such as iso-nitrile, rhodanide, azide or trifluormethane.

There is the further possibility of adding halogen-aryls and the corresponding hydroaromatic compounds, as well as dihalogenorganyls and halogen compounds of unsaturated hydrocarbons. The addition of di- or pseudo-halogen compounds, for example 1,2-dihalogenethane or bromtrifluoromethane, further reduces the oxygen sensitivity of many coordination compounds.

The versatility of applying the novel method will be illustrated in the formulas below. It is obvious therefrom that the corresponding arsonium compounds are likewise formed in analogy to the convenient preparation shown by the foregoing examples with respect to ammonium-, phosphonium- and stibonium-salt complex compounds:

$$R_3P + GaR_3 + C_6H_5CH_2F \rightarrow [R_3(C_6H_5CH_2)P][R_3GaF]$$

$$2R_3As + 2InR_3 + (CH_3)_2SO_4 \rightarrow$$
$$[R_3(CH_3)As]_2[R_3InSO_4InR]_3$$

$$R_3Sb + AlR_2Cl + ClC_2H_4Cl \rightarrow [R_3(ClC_2H_4)Sb][R_2AlCl_2]$$

$$C_5H_5N + BR_3 + iC_3H_7F \rightarrow [(iC_3H_7)C_5H_5N][R_3BF]$$

$$R_3N + 2BeR_2 + C_6H_5CH_2F \rightarrow$$
$$[R_3(C_6H_5CH_2)N][R_2BeFBeR_2]$$

$$R_2PH + B(C_6H_5)_3 + C_6H_5Br \rightarrow$$
$$[R_2(C_6H_5)PH][(C_6H_5)_3BBr]$$

$$(CH_2)_4O + AlRBr_2 + C_6H_5CH_2Cl \rightarrow$$
$$[(C_6H_5CH_2)(CH_2)_4O][RAlBr_2Cl]$$

$$R_2Te + GaR_3 + RI \rightarrow [R_3Te][R_3GaI]$$

Relative to those complex compounds that contain in their onium complex an aryl or hydroaromatic carbohydrate radical, the tendency to spontaneous inflammability of the complex-salt liquid in air is eliminated. Such radicals for example are benzyl, phenyl or cyclohexyl radicals.

The method of the invention furnishes in a simple manner and with a good yield various onium-salt complex compounds which heretofore have not been producible at all or only under difficult conditions. Further, the invention can be applied for producing onium salts of difficult accessibility, by first producing the onium-salt complex compounds according to the invention and then modifying it to the onium salt. There are several ways of thus reducing the complex compounds. By one manner, the compound can be subjected to the action of water or methanol. This solvolytic method causes the evolving onium salt to dissolve in the solvents without dissociating. The salt is then recovered by concentrating the filtrate. Another way involves the oxidation-splitting of the complex into onium salt and other oxidation products by the action of oxygen. Since the onium salt is insoluble in aromatic hydrocarbons such as toluol, xylol, etc., and the other oxidation products are soluble therein, the separation can be effected in this manner. A third way of obtaining the onium salt from the onium salt complex compound is to displace the onium salt from the complex compound by addition of a stronger complex partner. Applicable as a stronger complex partner is a different onium salt as well as a different but stronger donor. The separation of the displaced onium salt can be effected on the basis of differences in solubility or, in the event volatile coordination compounds result, by means of distillation. In the latter case, the thermal stability of the onium salt being produced must be taken into account. A further example will serve to illustrate this mode of applying the method of the invention.

EXAMPLE 14

Tetraethylstibonium-bromide [$(C_2H_5)_4Sb$]$^+$Br$^-$

The onium salt is obtained by solvolysis with methanol from the tetraethylstibonium-triethylaluminum bromide, the preparation of which is described above in Example 7.

At room temperature, 85 ml. of the liquid onium-salt complex compound, 110.5 g. (0.255 mol) are diluted with an equal volume of dichloromethane and are dripped into a mixture of 31 ml. methanol, 25.0 g. (0.780 mol), and 425 ml. of dichlormethane under intensive stirring in a 2-liter reaction vessel. Gradually, a white coloration appears with simultaneous evolution of ethane gas. The reaction heats the mixture to 40–50° C. After the entire quantity of liquid is added, the contents are boiled and refluxed for 2 hours. Thereafter the cooled reaction mixture is centrifuged for about 30 minutes at 3000 rotations per minute. The onium salt/dichlormethane solution becomes separated from the finely divided triethylaluminum which floats to the top and can be decanted. A white, jelly-like methylate residue is then boiled twice, each time with 250 ml. dichlormethane for one hour with refluxing and is again separated from the solution by centrifuging. The dichlormethane solutions are combined and still containing some of the $Al(OCH_3)_3$ are condensed to about 250 ml., then admixed with the same volume of absolute methanol and centrifuged for 30 minutes. The now clear and colorless solution is decanted off the white residue and concentrated at normal pressure to one-third of its volume. The residual solvent is withdrawn at a maximal bath temperature of 50° C. and about 12 torr. The colorless-crystalline residue consists of tetraethylstibonium-bromide. The yield is 63 g. corresponding to 77.6% of the theoretical amount.

Of even more significance than in the inorganic and metalorganic fields is the use of the method according to the invention in the preparative organic chemistry for quaternization of complicated tertiary amines and phosphines. The known trialkylaluminums are suitable auxiliary substances to act as strong acceptors. A wide choice with respect to halogen alkyls and halogen aryls is available. Aside from the readily reacting iodides and bromides, the benzyl halides are particularly suitable because their considerable polarity permits addition thereof. The quaternary salts, isolatable in good yield, also afford convenient means for reconstituting the tertiary amine or phosphine.

Onium-salt complex compounds having a pronounced salt character, a good solubility and in many cases very low melting points, constitute valuable electrolytes which, aside from the purposes mentioned above, are applicable in electrolytic capacitors, as conducting salts in galvanic baths, for polarographic purposes or as meltable electrolytes for electric refining and electroplating. In addition, they may be used as controlled potential reducing agents and as intermediates for synthesis.

It is to be understood that, while the particular examples are demonstrative of specific aspects of this invention, they are not intended to limit its scope with respect to products to be made. The conditions and starting materials for the invention are not limited to those disclosed above but rather the disclosure is to be read in the light of equivalents of the disclosed materials.

I claim:
1. The method of producing onium-salt complex compounds, which comprises reacting three components in substantially stoichiometric ratios:
   (a) an electron donor compound, $R'_nH_{m-n}Y$;
   (b) an electron acceptor compound, $MeR''_nX'_{m-n}$; and
   (c) an organyl compound RX,
wherein, R', R'' denote radials chosen from the group consisting of alkyl and aryl radicals which may be the same, H is hydrogen, X is chosen from the group consisting of halogen and pseudohalogen radicals, X' is chosen from the group consisting of halogen and hydrogen, Y is chosen from the group consisting of elements from N, P, As, Sb, Se and Te, and Me is chosen from the group consisting of elements from Be, Zn, Al, Ga, In, B, and Sn, and $m$ denotes the valence of the respective elements Y and Me, the index $n$ assuming integer values above zero to $m$, and (c) is added after (a) and (b) have reacted to form a coordination compound.

2. The method of producing onium-salt complex compounds, which comprises reacting three components in substantially stoichiometric ratios:
   (a) an electron donor compound, $R'_nH_{m-n}Y$;
   (b) an electron acceptor compound, $MeR''_nX'_{m-n}$; and
   (c) an organyl compound RX,
wherein R, R', R'' denote radicals chosen from the group consisting of alkyl and aryl radicals which may be the same, H is hydrogen, X is chosen from the group consisting of halogen and pseudohalogen radicals, X' is chosen from the group consisting of halogen and hydrogen, Y is chosen from the group consisting of elements from N, P, As, Sb, Se and Te, and Me is chosen from the group consisting of elements from Be, Zn, Al, Ga, In, B and Sn, and $m$ denotes the valence of the respective elements Y and Me, the index $n$ assuming integer values above zero to $m$, and (b) and (c) are reacted to form an adduct which is then reacted with (a).

3. The method of producing onium-salt complex compounds, which comprises reacting three components in substantially stoichiometric ratios:
   (a) an electron donor compound, $R'_nH_{m-n}Y$;
   (b) an electron acceptor compound, $MeR''_nX'_{m-n}$; and
   (c) an organyl compound RX,
wherein R, R', R'' denote radicals chosen from the group consisting of alkyl and aryl radicals which may be the same, H is hydrogen, X is chosen from the group consisting of halogen and pseudohalogen radicals, X' is chosen from the group consisting of halogen and hydrogen, Y is chosen from the group consisting of elements from N, P, As, Sb, Se and Te, and Me is chosen from the group consisting of elements from Be, Zn, Al, Ga, In, B and Sn, and $m$ denotes the valence of the respective elements Y and Me, the index $n$ assuming integer values above zero to $m$, and the acceptor compound (b) is reacted with a weak donor compound weaker than the donor compound to be converted, and the resulting coordination compound is then reacted with the donor component, displacing the weaker donor to form the coordination compound [(a), (b)], and reacting said compound with the organyl to form the onium-salt complex.

4. The method of producing onium-salt complex compounds, which comprises reacting three components in substantially stoichiometric ratios:
   (a) an electron donor compound, $R'_nH_{m-n}Y$;
   (b) an electron acceptor compound, $MeR''_nX'_{m-n}$; and
   (c) an organyl compound RX,
wherein R, R', R'' denote radicals chosen from the group consisting of alkyl and aryl radicals which may be the same, H is hydrogen, X is chosen from the group consisting of halogen and pseudohalogen radicals, X' is chosen from the group consisting of halogen and hydrogen, Y is chosen from the group consisting of elements from N, P, As, Sb, Se and Te, and Me is chosen from the group consisting of elements from Be, Zn, Al, Ga, In, B and Sn, and $m$ denotes the valence of the respective elements Y and Me, the index $n$ assuming integer values above zero to $m$, and (a), (b) and (c) are simultaneously reacted in a single stage.

5. $[(C_2H_5)_4Sb][(C_2H_5)_3AlBr]$
6. $[(C_2H_5)_4Sb][(C_2H_5)_3AlCl]$.
7. $[(C_2H_5)_4Sb][(C_2H_5)_3AlI]$.

References Cited

UNITED STATES PATENTS

| | | | |
|---|---|---|---|
| 3,073,884 | 1/1963 | Pinkerton | 136—100 |
| 3,166,603 | 1/1965 | Strohmeier | 260—665 |
| 3,308,143 | 3/1967 | Poe et al. | 260—448 |

OTHER REFERENCES

Farina, Gazz. Chem. Ital., vol. 89 (1959), pp. 2532–42 (copy of English translation supplied).

Lyon et al., J. Chem. Soc. (London), 1942, pp. 666–71.

Hein et al., Zeit. Physik Chemie Band 165 (1933), pp. 352–3 and pp. 365–6.

Coates, Organo-Metallic Compounds; John Wiley and Sons, Inc., New York, N.Y., 2nd edition (1960), pp. 136–7.

Morgan, Organic Compounds of the Arsenic Antimony, Longmans, Green and Co., London, 1918, p. 57.

Smith et al., J. Am. Chem. Soc. 74 (1952), p. 512.

TOBIAS E. LEVOW, *Primary Examiner.*

A. P. DEMERS, *Assistant Examiner.*

U.S. Cl. X.R.

204—14; 252—62.2; 260—290, 346.1, 429.7, 429.9, 440, 441, 446, 448, 567.6, 606.5, 607, 665